July 25, 1950
C. A. STEEN
2,516,810
MULTIPHASE ELECTRODE
Filed Aug. 29, 1947
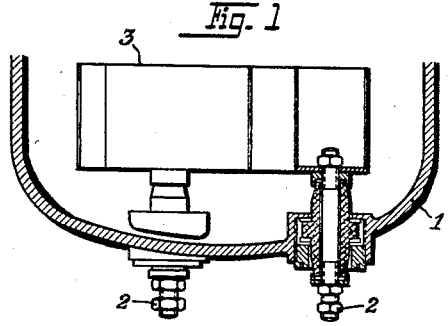
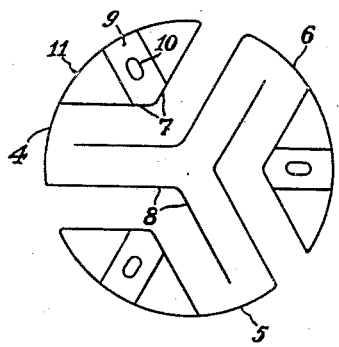
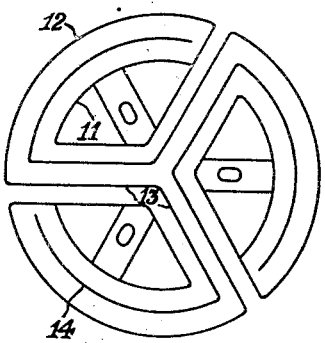
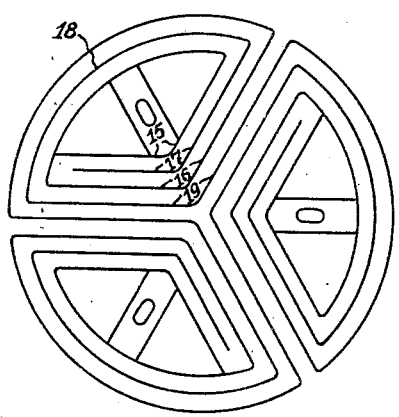
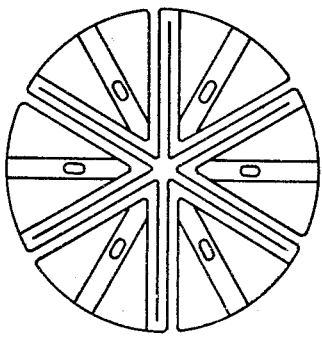
Inventor
Carl August Steen
by Somners + Young
Attorneys Patented July 25, 1950

2,516,810

UNITED STATES PATENT OFFICE 2,516,810

MULTIPHASE ELECTRODE

Carl August Steen, Getinge, Sweden

Application August 29, 1947, Serial No. 771,222
In Sweden November 11, 1944

7 Claims. (Cl. 219—40)

This invention relates to a multiphase electrode comprising at least two individual electrodes for heating a liquid conducting the current passing between the individual electrodes.

One object of the invention is to provide a such multiphase electrode which has large current delivering capacity within a limited volume, especially for boiling pans and steam generators supplied with low tension current. In boiling pans the steam generating device thereby may be manufactured with a small diameter and a small volume for the electrolyte which must be heated before the steam generation begins. This is of special advantage in boiling pans of the type where the electrolyte by means of the steam pressure is forced up into an expansion vessel for automatic regulation of the current.

An other object is to provide a multiphase electrode in which the single electrodes may be easily manufactured and supported in spaced relation in a simple manner.

The invention is illustrated on the accompanying drawing where

Fig. 1 is a partial vertical section through a boiling pan with an embodiment of a multiphase electrode according to the invention, Fig. 2 is a plan view of the multiphase electrode according to Fig. 1, Figs. 3–5 are plan views of three other embodiments of the multiphase electrode according to the invention.

The bottom 1 of the steam generating space of a boiling pan is provided with three insulator pins 2 passing through the bottom and supporting each one of the three single electrodes constituting the multiphase electrode 3. All single electrodes 4, 5, 6 are made quite identical. Each single electrode is made of a strip of sheet metal and comprises two electrode elements 7 forming an angle element and further two electrode elements 8 forming an other angle element. The both angle elements are connected by an arc-shaped element serving as an active electrode area. The angle element 7 is closed by an arc-shaped element 11 to form a sector of a circle which is provided with a radial plate or beam 9 with an aperture 10 for fastening the single electrode on the insulator pin 2. The electrode elements in the three single electrodes form three bundles of substantially radial direction at an angle of 120° between each other. The angle element 8 of the single electrode 4 has its electrode elements located between electrode elements belonging to the single electrodes 5 and 6, and also these both single electrodes have an angle element located between electrode elements belonging to the other single electrodes. Each single electrode may be made of a single metal strip bent to the illustrated form and the sector portion with the supporting beam 9 may be welded together so as to form a rigid construction of the whole single electrode. If a short distance is used between adjacent electrode elements insulating pieces may be provided between them. Two insulating pieces may be secured to the adjacent electrodes opposite each other and engage each other as coupling members in order to prevent the electrode members from being displaced relative to each other, but it is obvious that also other kinds of insulating members may be used to fix the electrode elements in correct relation to each other. An advantage is that the consumption of current is quite the same for all single electrodes.

According to Fig. 3 the arc-shaped element 11 at one end is connected with an other concentrically extending arc-shaped element 12 which continues as a further angle element 13, located between electrode elements belonging to other single electrodes, and a further arc-shaped element 14 between two arc-shaped elements belonging to an other single electrode.

According to Fig. 4 the angle element 15 at one end is connected with an other parallel angle element 16, between which is provided an angle element 17 belonging to an other single electrode and continuing as an arc-shaped element 18 and an angle element 19 extending parallel to the angle elements 15, 16, 17. In this way each single electrode comprises eight parallel, radially directed electrode elements, of which thus six have their both sides loaded. This electrode device therefore represents a considerable load concentrated within a small volume.

In Fig. 5 a multiphase electrode corresponding to Fig. 2 but with six single electrodes is shown. If this electrode is used for three-phase current three single electrodes forming 120° to each other may be connected to the three lines, and the electrode is thereby working with half load. If the single electrodes located opposite each other are connected the electrode is working at full load. It is also possible to use this electrode for one-phase in which case three single electrodes at 120° angle may be connected to the one pole and the remaining three single electrodes to the other pole. By switching off one or more single electrodes the load may be regulated in a great number of stages.

The invention is not limited to the embodi-

I claim:

1. A multiphase electrode composed of a plurality of individual electrodes, each of said individual electrodes comprising pairs of substantially radial electrode elements, both electrode elements in each of said pairs being connected to each other at one end to form an angle element, at least two such angle elements being connected to each other by means of a connecting element forming an active electrode area, one angle element of each single electrode having both of its electrode elements located between parallel electrode elements belonging to at least one of the other individual electrodes, and each individual electrode being supported by an insulator pin.

2. A multiphase electrode composed of a plurality of individual electrodes, each individual electrode of which comprises pairs of substantially radial electrode elements, both electrode elements in each of said pairs being connected to each other at one end to form an angle element, at least two such angle elements being connected to each other by means of a connecting element forming an active electrode area, one angle element of each single electrode having both of its electrode elements located between parallel electrode elements belonging to at least one of the other individual electrodes, one angle element of each individual electrode being closed by an arc-shaped element in the form of a sector of a circle, said sector-shaped element having a cross beam, and said cross beam being supported by an insulator pin.

3. A multiphase electrode composed of a plurality of individual electrodes, each individual electrode of which comprises pairs of substantially radial electrode elements, both electrode elements in each of said pairs being connected to each other at one end to form an angle element, a first such angle element being closed by an arc-shaped element in the form of a sector of a circle, said sector-shaped element having a cross beam supported by an insulating pin, a second angle element located angularly displaced relative to said first angle element and connected with the same by means of an arc-shaped connecting element which is concentric to said first arc-shaped element and forms an active electrode area.

4. A multiphase electrode according to claim 3, and in which said second angle element has an arc-shaped extension located between arc-shaped elements belonging to another of the individual electrodes.

5. A multiphase electrode composed of a plurality of individual electrodes, each individual electrode of which comprises pairs of substantially radial electrode elements, both electrode elements in each of said pairs being connected to each other at one end to form an angle element, a first such angle element being closed by an arc-shaped element in the form of a sector of a circle, said sector-shaped element having a cross beam supported by an insulator pin, a second angle element enclosing said first angle element and having its electrode elements parallel to the electrode elements of said first angle element, one end of said second element being connected with the corresponding end of said first angle element, and the other end being connected with a third angle element by means of an arc-shaped connecting element arranged concentric to said arc-shaped element and forming an active electrode area.

6. A multiphase electrode according to claim 5, and in which said third angle element is connected to a fourth angle element by means of an arc-shaped element located between arc-shaped elements belonging to another of the individual electrodes.

7. A multiphase electrode composed of a plurality of individual electrodes, each individual electrode of which is made of a strip of sheet metal of constant width and comprising pairs of substantially radial electrode elements, both electrode elements of each of said pairs being connected to each other at one end to form an angle element, at least two such angle elements being connected to each other by means of a connecting element forming an active electrode area, one angle element of each individual electrode having both of its electrode elements located between parallel electrode elements belonging to at least one other individual electrode, and each individual electrode being supported by an insulator pin.

CARL AUGUST STEEN.

REFERENCES CITED

The following references are of record in the file of this patent:

UNITED STATES PATENTS

| Number | Name | Date |
| --- | --- | --- |
| 905,597 | Smyser | Dec. 1, 1908 |
| 1,277,422 | Iglesias | Sept. 3, 1918 |
| 1,382,158 | Abogado | June 21, 1921 |
| 1,550,224 | Otis et al. | Aug. 18, 1925 |
| 1,683,050 | Penzold | Sept. 4, 1928 |